United States Patent [19]

Larson

[11] Patent Number: 5,452,344
[45] Date of Patent: Sep. 19, 1995

[54] COMMUNICATION OVER POWER LINES

[75] Inventor: Rodney L. Larson, Minnetonka, Minn.

[73] Assignee: Datran Systems Corporation, Minnetonka, Minn.

[21] Appl. No.: 153,301

[22] Filed: Nov. 16, 1993

Related U.S. Application Data

[63] Continuation-in-part of Ser. No. 891,298, May 29, 1992.

[51] Int. Cl.$^6$ .......................................... H04M 11/00
[52] U.S. Cl. ................................. 379/107; 340/538; 340/310.01
[58] Field of Search ........... 340/538, 531, 533, 310 R, 340/310 A; 379/107, 106

[56] References Cited

U.S. PATENT DOCUMENTS

| | | |
|---|---|---|
| 3,942,168 | 2/1976 | Whyte . |
| 4,027,332 | 5/1977 | Wu et al. . |
| 4,086,434 | 4/1978 | Bocchi . |
| 4,357,605 | 11/1982 | Clements . |
| 4,455,453 | 6/1984 | Parasekvakos et al. . |
| 4,577,333 | 3/1986 | Lewis et al. . |
| 4,578,536 | 3/1986 | Oliver et al. . |
| 4,639,728 | 1/1987 | Swanson . |
| 4,710,919 | 12/1987 | Oliver et al. . |
| 4,715,045 | 12/1987 | Lewis et al. . |
| 4,720,851 | 1/1988 | Smith . |
| 4,755,792 | 7/1988 | Pezzolo et al. ....................... 340/538 |
| 4,763,103 | 8/1988 | Galula et al. .................... 340/310 R |
| 4,811,389 | 3/1989 | Balch . |
| 4,815,106 | 3/1989 | Propp et al. . |
| 4,835,517 | 5/1989 | van der Gracht et al. . |
| 4,856,054 | 8/1989 | Smith . |
| 4,885,563 | 12/1989 | Johnson et al. . |
| 4,885,564 | 12/1989 | Vercellotti et al. . |
| 4,893,332 | 1/1990 | Brown . |
| 4,896,277 | 1/1990 | Vercellotti et al. . |
| 4,902,965 | 2/1990 | Bodrug . |
| 4,962,496 | 10/1990 | Vercellotti et al. . |
| 4,968,970 | 11/1990 | LaPorte .......................... 340/310 R |
| 5,010,568 | 4/1991 | Merriam et al. . |
| 5,072,370 | 12/1991 | Durdik . |
| 5,155,481 | 10/1992 | Brennan, Jr. et al. .......... 340/310 R |
| 5,227,762 | 7/1993 | Guidette et al. ..................... 340/538 |
| 5,264,823 | 11/1993 | Stevens ........................... 340/310 R |

OTHER PUBLICATIONS

National Semiconductor, "LM1893/LM2893 Carrier-Current Transceiver", May 1989, pp. 1–24.
National Semiconductor, "LM/893 Carrier-Current Transceiver", pp. 4–47.

Primary Examiner—Curtis Kuntz
Assistant Examiner—Stella L. Woo
Attorney, Agent, or Firm—Schwegman, Lundberg & Woessner

[57] ABSTRACT

The present invention describes an FSK carrier communication systems for transmitting and receiving data on a electric utility line even in the presence of extreme noise. The present invention uses a unique FSK transmit and receive protocol to distinguish between noise and actual data. By careful selection of the space and mark frequencies transmitted on the power line and by using a unique variable width data-bit protocol, the receiver can distinguish between actual data and corrupted information due to noise spikes with nearly error free communication.

4 Claims, 8 Drawing Sheets

COMMUNICATION OVER POWER LINES

The present patent application is a continuation-in-part of U.S. patent application No. 07/891,298 entitled "UTILITY MONITOR COMMUNICATIONS SYSTEMS" filed May 9, 1992, which is hereby incorporated by reference.

FIELD OF THE INVENTION

The present invention relates to data communication systems and in particular, the present invention relates to data communications over electric utility lines to transfer information between a local and remote site even in a noisy communications medium.

BACKGROUND OF THE INVENTION

Communications over electric power lines has the advantage over other forms of communication since most residential and commercial structures are wired with electric conductors carrying line current to the structure. Since these structures are already "wired", this affords an excellent opportunity to take advantage of existing infrastructure for communication systems.

Various forms of communication over power lines are known in the art. For example, U.S. Pat. No. 4,885,563 to Johnson et al., issued Dec. 5, 1989 entitled "POWER LINE CARRIER COMMUNICATION SYSTEMS" describes a power line carrier system uses a current carrier transceiver as the communications interface to the power line. This system using FSK modulation over the power line but suffers in a noisy environment and is prone to noise corruption of data. Other patents related to Johnson et al. are U.S. Pat. No. 4,885,564 and U.S. Pat. No. 4,896,277.

U.S. Pat. No. 3,942,168 to Whyte issued Mar. 2, 1976 entitled "DISTRIBUTION NETWORK POWER LINE COMMUNICATION SYSTEM" describes a pulse with a modulated FSK signal impressed upon a power line at approximately 100 to 102 kilohertz. The signal has a fixed mark-space protocol such that the timing of the ONE (mark) and the ZERO (space) frequencies of the FSK signal are always the same. This system, like Johnson et al., suffers from noise corruption of data signals in a noisy power line environment.

There is a need in the art for a power line communication system for transmitting and receiving digital information which is noise immune and which detects when information is truly corrupted by noise.

SUMMARY OF THE INVENTION

The foregoing and other short comings of the prior art are solved by the present invention. The present invention describes an FSK carrier communication systems for transmitting and receiving data on a electric utility line even in the presence of extreme noise. The present invention uses a unique FSK transmit and receive protocol to distinguish between noise and actual data. By careful selection of the space and mark frequencies transmitted on the power line and by using a unique variable width databit protocol, the receiver can distinguish between actual data and corrupted information due to noise spikes with nearly error free communication.

BRIEF DESCRIPTION OF THE DRAWINGS

In the drawings, where like numerals refer to like components throughout the several views.

DETAILED DESCRIPTION OF THE PREFERRED EMBODIMENT

In the following preferred description of the preferred embodiment, references made to the accompanying drawings which form a part hereof, and in which is shown by way of illustration specific embodiments in which the invention may be practiced. This embodiment is described in sufficient detail to enable one skilled in the art to make and practice the invention, and it is to be understood that other embodiments may be utilized and that structural, electrical, or logical changes may be made without departing from the spirit and the scope of the present invention. The following detailed description is, therefore, not to be taken in a limiting since, and the scope of the present invention is defined only by the appendant claims.

Figure 1:
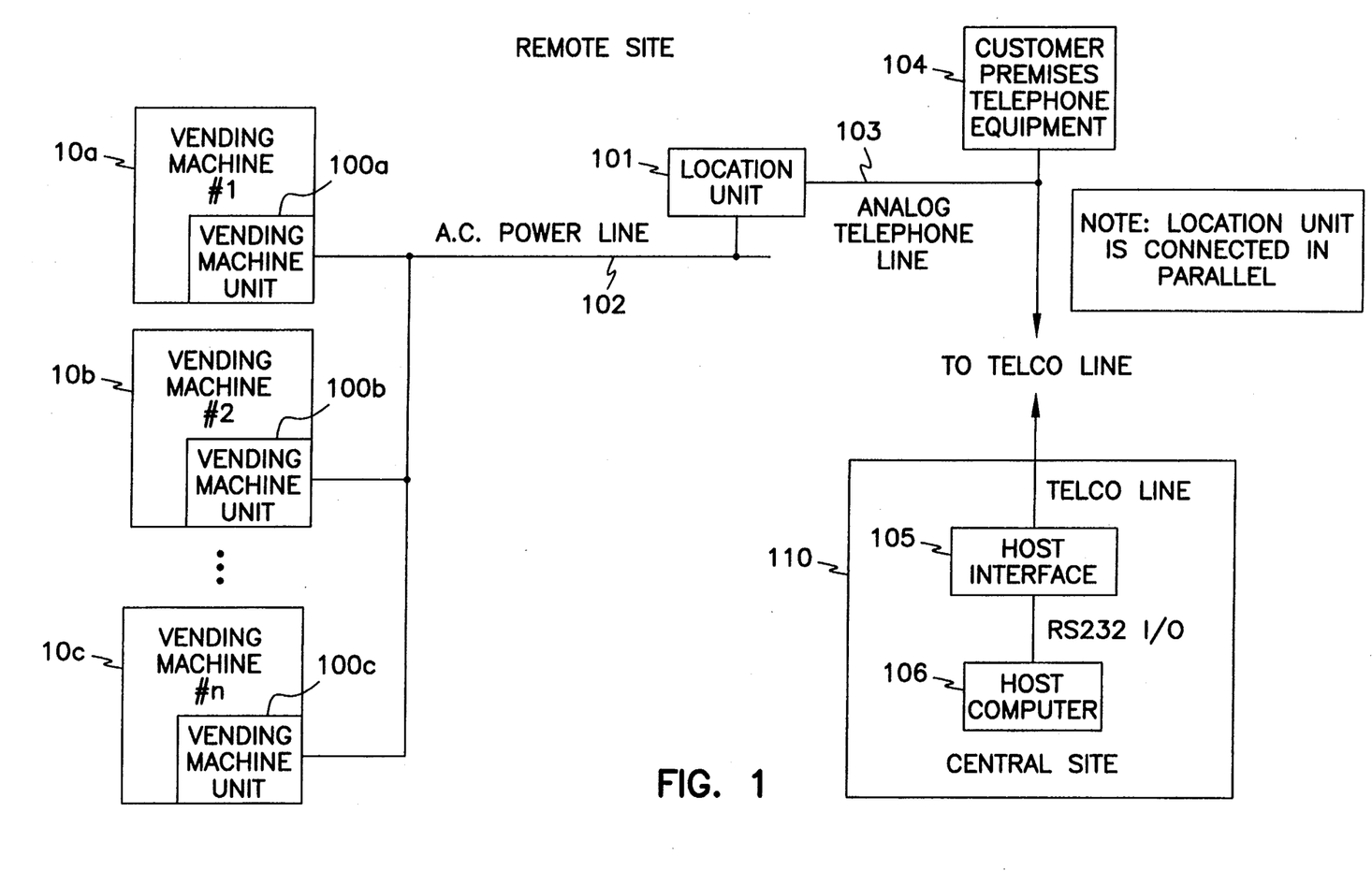
FIG. 1 is a block diagram of a vending machine application of the preferred embodiment of the present invention.

An overall description of the operation of the preferred embodiment of the present invention is shown in FIG. 1. The present invention allows communication of data information over power lines even in a noisy environment. The preferred embodiment of the present invention is adaptable to a multitude of uses in which communication over power lines is advantageous such as reporting information from vending machines, reporting utility meter usage, etc.

In the preferred application of the preferred embodiment of the present invention, the vending machine environment will be described. FIG. 1 shows a plurality of vending machines 10a, 10b and 10c, communicating to a central location 101 through an AC power line 102 using vending machine units 100a, 100b, 100c, corresponding to internally installed vending machine units within vending machines 10a, 10b and 10c. The vending machine units 100a, 100b, 100c, generally referred to as vending machine unit 100, collects information from its respective vending machine and communicates that information over the AC power line 102 to a central reporting unit 101.

Location unit 101 communicates the collected information via an analog telephone line 103 to a central site 110 using a standard telephone line connection through a telephone company's central office. A host interface 105 located at the central site 110 receives the information using a communications protocol described in U.S. patent application No. 07/891,298 entitled "Utility Monitor Communications Systems" filed May 29, 1992, which is hereby incorporated by reference. The host interface decodes the information received from the location unit 101 and downloads this information to a central reporting host computer 106 via an RS232 I/O interface. In this fashion, vending machine information can be collected remotely and communicated to a central site without the need for human intervention.

Figure 2:
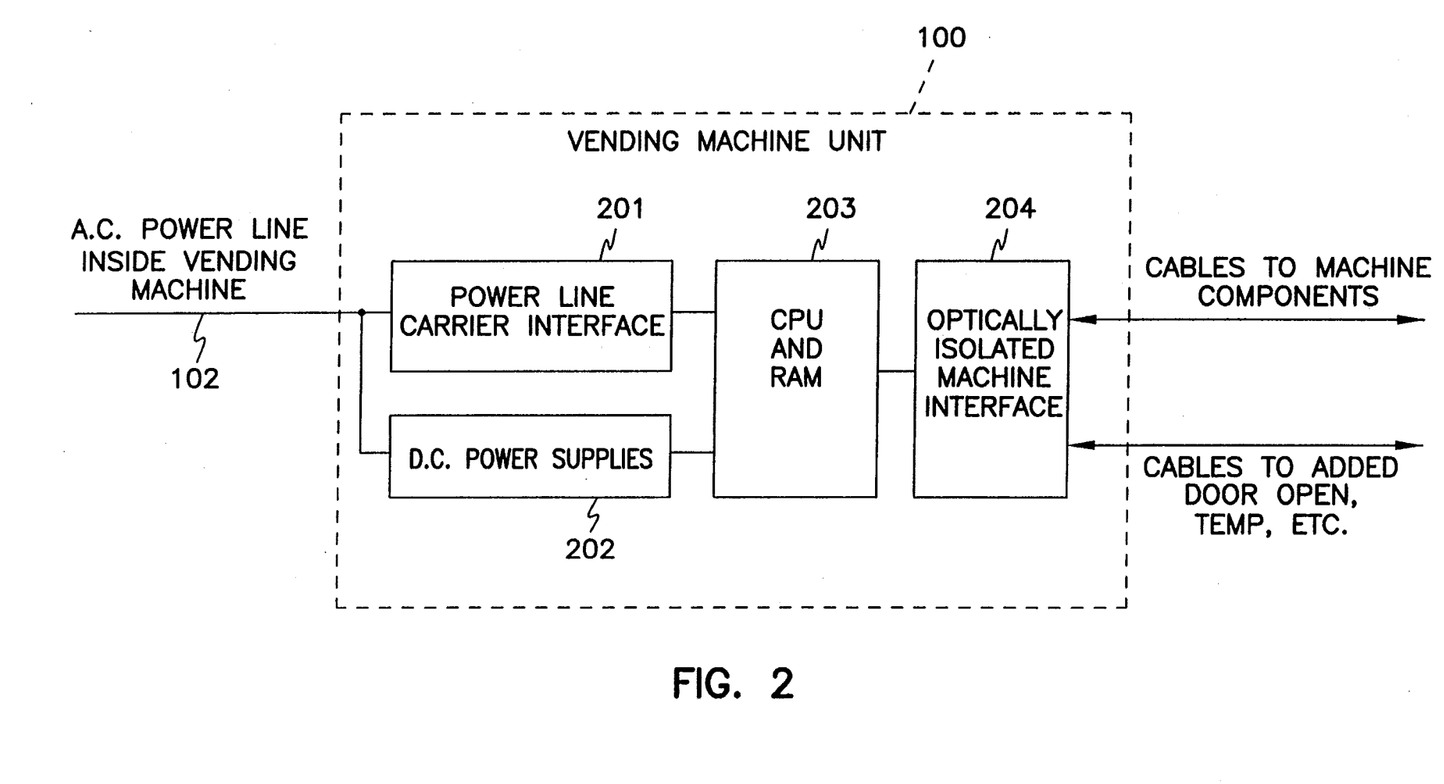
FIG. 2 is a detailed block diagram of the vending machine unit 100 of FIG. 1.

The vending machine unit 100 is described in more detail in FIG. 2. The power line interface 201 communicates information by transmitting and receiving digital data over the AC power line 102. A local power supply source 202 takes power for supplying the circuits of vending machine unit 100 from the AC power line 102 in parallel with the power line carrier interface 201. A central processor including random access memory (RAM) 203 is used for collecting information from the vending machines 10a, 10b, 10c, etc. through an optically isolated machine interface 204. By optically isolating the vending machines 10 from the AC power line 102, the safety integrity of the vending machines is maintained. Status information is collected by CPU 203 through the optically isolated machine interface 204 for such status information as whether the door is open, the temperature of the vending machine, etc. In addition, interface 204 provides information as to the accounting components of the vending machine to collect such information as amounts of money collected, remaining stock, etc. The collected information is then retrieved and stored in CPU 203 for downloading to the location unit 101 via power lines 102 either on demand, by local interrupt, by polling, by time of day or many other initiating factors.

Figure 3:
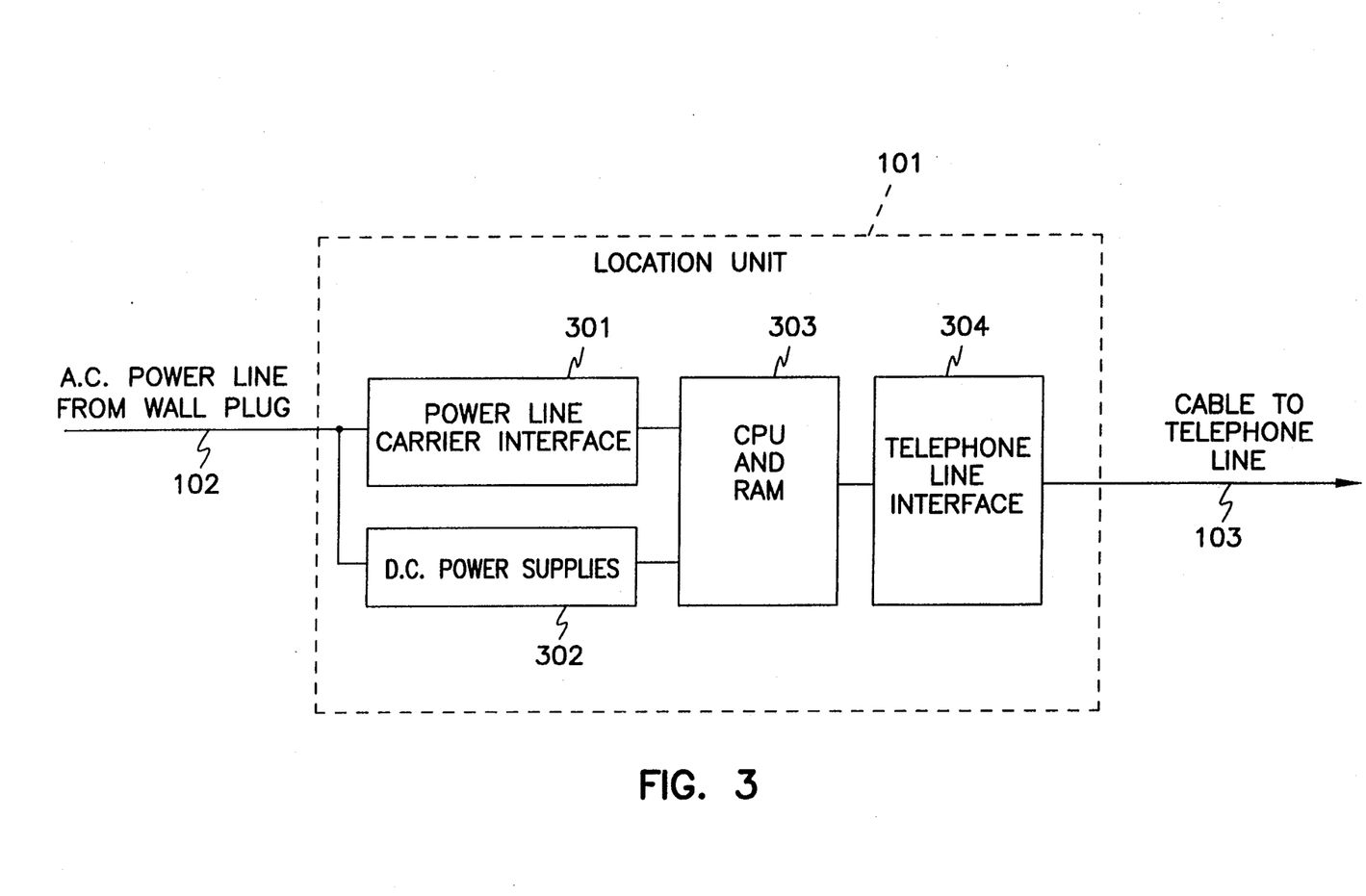
FIG. 3 is a detailed block diagram of the location unit 101 of FIG. 1.

Location unit 101 is described more fully in FIG. 3. Location unit 101 receives information and transmits commands over AC power line 102 through power line interface 301. Power line interface 301 is similar to the power line interface 201 of the vending machine unit 100 of FIG. 2. Also, an integral power supply 302 receives power for CPU and RAM circuit 303 from AC power line 102, similar to the operation of the power supply circuit 202 in vending machine unit 100 described in FIG. 2. Also, CPU and RAM circuit 303 collects the information to be sent to the host computer and stores it in an integral local RAM memory. A telephone line interface circuit 304 connects to telephone line 103 for downloading information to the host computer 106 of central site 110 based on any one of a number of triggering factors such as polling, time of day, etc.

Figure 4:
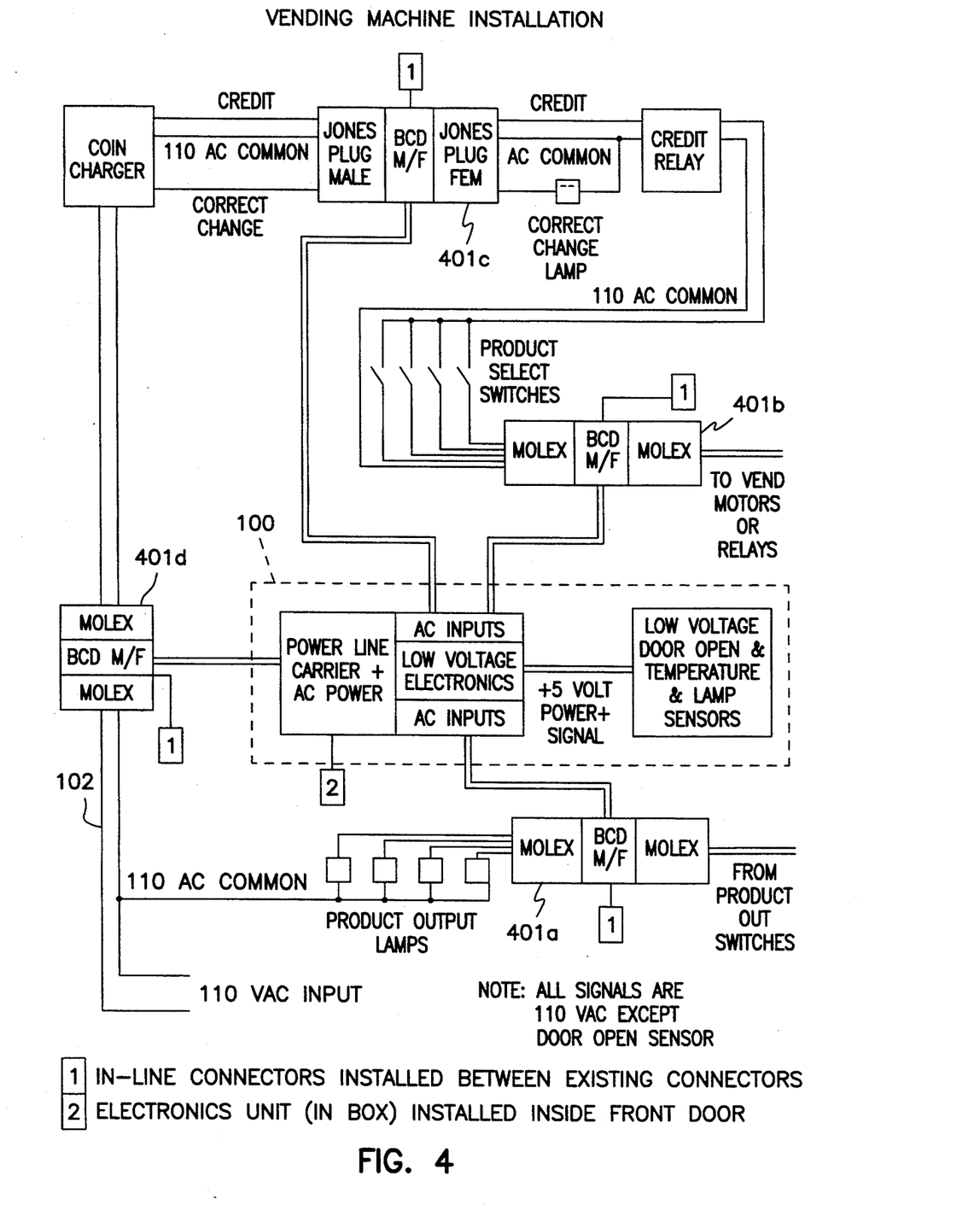
FIG. 4 is a detailed block diagram of a typical vending machine installation for the preferred embodiment of the present invention.

A typical vending machine installation is shown in FIG. 4. By using special connectors, called breakout connectors, to interface with the vending machine, the vending machine 100 can be made an integral part of the operating vending machine 10 for collecting status information and downloading that information to the location unit 101 through power line 102 without interfering with the operation of the vending machine. For example, special Molex breakout cables 401a, 401b, 401c and 401d allow the vending machine unit 100 to interface to the various product-out lamps, machine relays/motors of the vending machine and money collecting apparatus through breakout connectors 401a, 401b and 401c, respectively. In addition, the power line interface for vending machine unit 100 is attached to power line 102 through breakout connector 401d. In this fashion, all the necessary reporting information can be collected from the operating vending machine without interfering with its operation.

Figure 5:
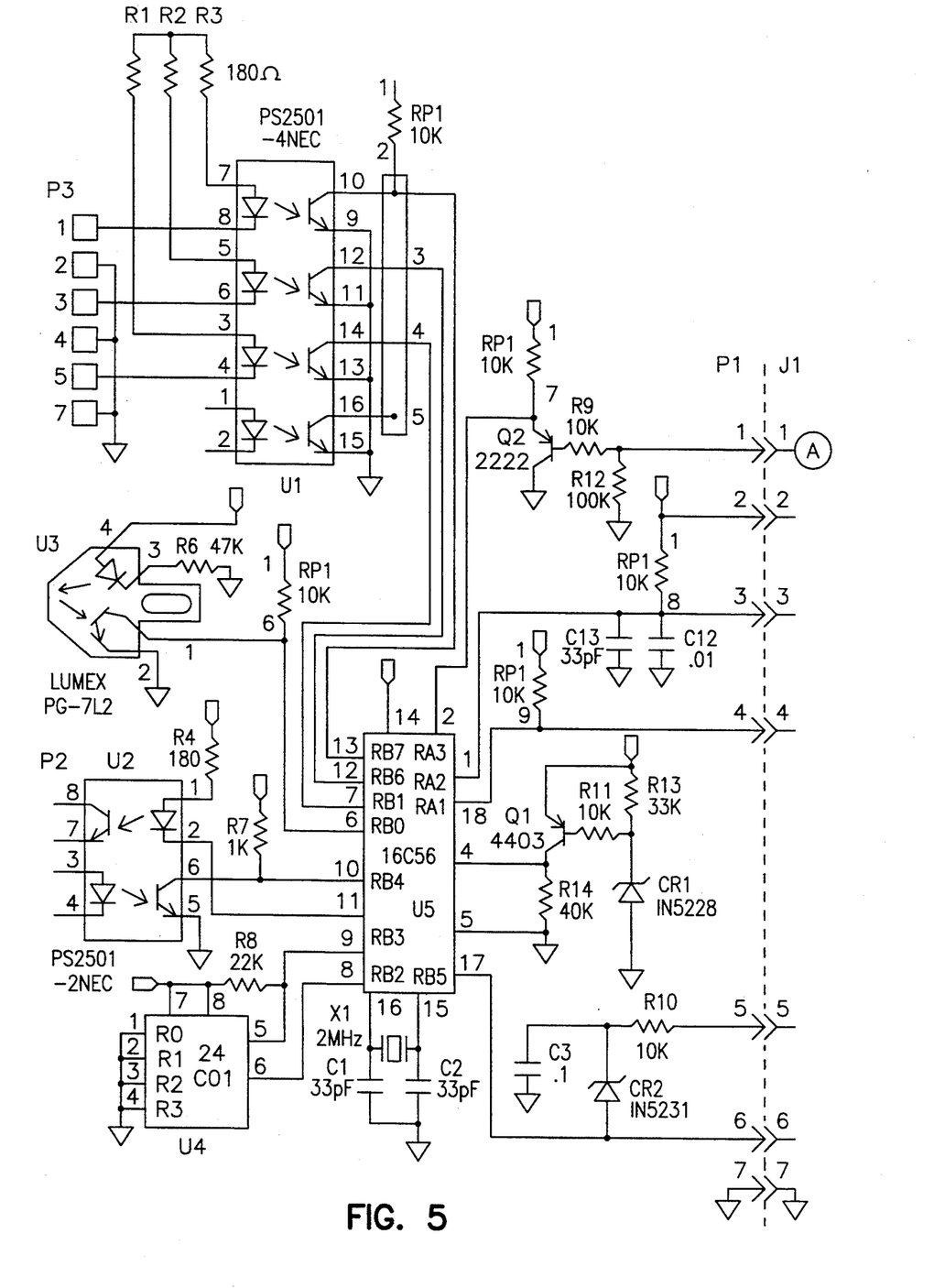
FIGS. 5 and 6 comprise detailed electrical schematic diagrams of the vending machine unit 100 of FIG. 1.
Figure 6:
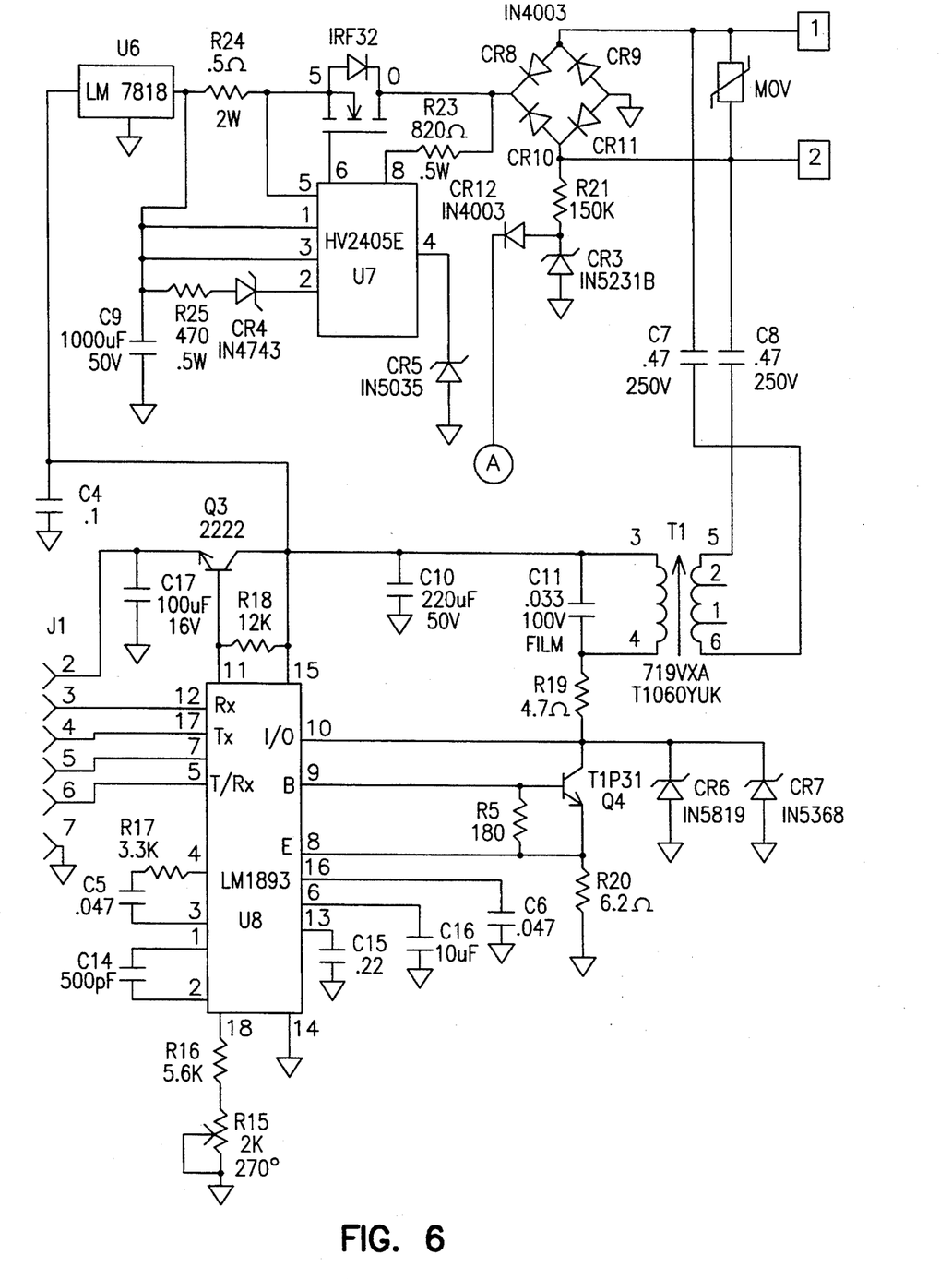

FIGS. 5 and 6 are detailed electrical schematic diagrams of the vending machine unit 100 of FIGS. 1 and 2. FIGS. 5 and 6 should be viewed left and right, respectively, for an entire schematic diagram. The location unit of FIG. 3 is nearly identical in design and implementation to the vending machine unit of FIG. 5 and 6.

The optically isolated machine interface 204 is shown in detail to the left of FIG. 5. Those skilled in the art will readily recognize that a wide variety of interfaces may be used to transmit and receive information from the vending machine, utility meter or whatever other device the preferred embodiment of the present invention is attached. Information collected through the connectors P3, P2 or Lumex connector U3 is collected by microcontroller U5 for storage in its internal memory. Microcontroller U5 controls the power line interface 201 through connector P1/J1 as shown in FIG. 5 and FIG. 6.

The power line driver U8 of FIG. 6 is, in the preferred embodiment of the present invention, part no. LM1893, which is a power line FSK transmit and receive integrated circuit available from National Semiconductor and other vendors. This FSK transceiver U8 interfaces to the power line through transformer T1 using a selected frequency based on C14 and R16 to select the carrier frequency.

The DC power supply is shown in the upper half of FIG. 6 in which a monolithic voltage regulator U6 is used to supply voltage for the circuitry of the vending machine unit 100.

Functional Operation

The power line carrier protocol is a key feature of the preferred embodiment of the present invention for allowing transmission of digital data over power lines even in a noisy environment. The preferred embodiment of the present invention uses a power line carrier protocol on an FSK (frequency shift keying) format. As described above, an FSK modem, part no. LM1893, is used as the FSK modem U8 onto which the power line carrier protocol of the preferred embodiment to the present invention is impressed.

The transmitter U8 of the vending machine unit 100 embodied in power line carrier interface 201 transmits a first frequency for a binary 1 and a second frequency for a binary 0. Typically, transmitter U8 transmits the correct frequencies for the data byte desired to be transmitted, however, the data is almost never received in an error-free environment. The AC power line is a very noisy environment, especially at the voltage zero crossings since impulse noise spikes are quite frequent and of large amplitude. Since the power line carrier interface 201 connects to the AC power line through a tuned high-Q (Q greater than 25) LC circuit, this impulse noise generates large amplitude, lightly damped sinusoidal responses. The FM receiver/FSK detector "sees" these inputs as data since they are in the valid frequency bandwidth. If the receiver 0/1 bit decision frequency is equal to the tune circuit resident frequency, this impulse noise causes rapid 0/1 bit transitions, which garbles the actual data. The decision frequency can be shifted off the resident frequency, but this does not generally completely eliminate the effect. With a shift in the decision frequency, the input then always goes high or low for the duration of the impulse noise input.

As a means to eliminate the noise problem, a pulse width modulation scheme is used in the preferred embodiment of the present invention along with a shift of the decision frequency and synchronization with the line voltage zero crossings. First the receiver is set to go high when any resident response input occurs. Any noise disturbance forces the receiver to a logic 1. Next, a pulse-width modulation frequency is chosen such that the impulse noise pulse is only one-quarter of the minimum one-half cycle. Also, the duration of the received low is not considered or measured. The received low is just detected and noted as being present.

Figure 8:
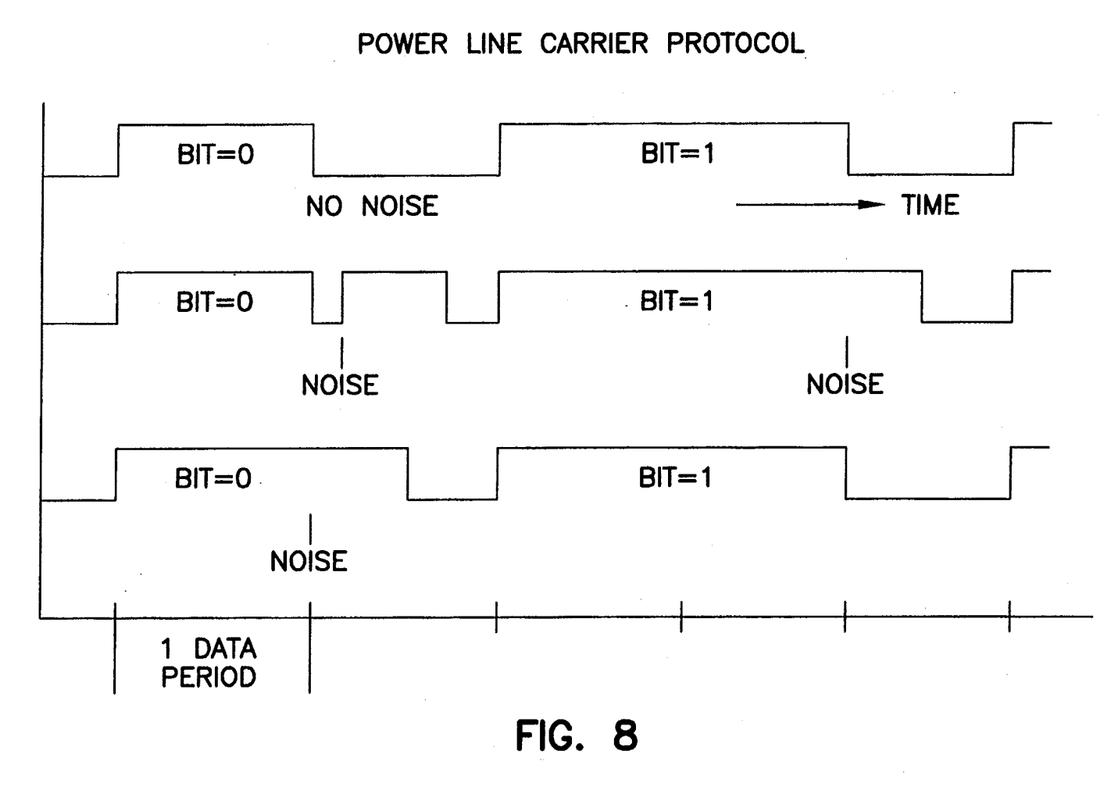
FIG. 8 is a timing diagram of the FSK protocol for the preferred embodiment of the present invention.

For the data bit equal to 0, the transmitter sends a high (1) frequency for a 1 data period, followed by a low (0) frequency for the remaining 1 data period, as shown in FIG. 8. For a data bit equal to 1, the transmitter sends the high frequency for 2 data periods, followed by a low frequency for a remaining single data period. Only the duration of the high determines the 0/1 value of the received bit. If any input noise triggers the receiver, then the received bit goes high for about one-quarter to one-third of the data period. Also, the base data period is chosen such that the extraneous inputs do not come often enough to affect more than one data period. This means that no high data period can be lengthened by more than one-quarter of a data period. Logically it follows that the low separator must be 1 data period. The 0/1 received bit decision then becomes:

(1) Ignore any high of less than one-half of the data period. This means that noise was injected into the carrier frequency during a low separator period.

(2) Any high duration greater than 1.5 data periods means a 1 bit is detected. Anything less is a 0 bit.

The selected data rate is approximately 50 baud. The data rate may be much higher, but then the transmitter and receiver have to avoid the line voltage zero crossings and send packets within 8 milliseconds. For example, the data rate could be higher and send only short packets at each AC line voltage peak, thus avoiding the usual disturbances at the line voltage zero crossings.

Referring once again to FIG. 8, when the transmitter is not transmitting a frequency, the receiver bit will oscillate due to a noise input. There are two ways to detect whether valid data is being received:

(1) Add a carrier detect circuit that enables the receiver after a frequency has been detected for more than 1 data period.

(2) Use a data preamble to synchronize the received data.

The first approach named above, used in the preferred embodiment of the present invention, means that the transmitter must first send the frequency for some duration to enable a receiver. Even after enabling the receiver, there is still the problem of synchronizing the data stream.

The second approach named above, in the alternative preferred embodiment of the present invention, solves both problems of synchronization and enabling the receiver at the same time. By using a synchronization data byte for a transmit preamble, the receiver may be enabled to the receive process and is synchronized to the received data. Because of the nature of noise inputs, the synchronization byte is selected to best operate as AA Hex. The transmitter is then alternatively sending short- and long-duration high frequencies for several bytes. The receiver can then detect this pattern as a valid incoming data stream versus random noise inputs. Noise inputs do not resemble this preamble pattern over several bytes.

After the synchronization byte pattern is detected, the receiver waits for the first byte that is not AA Hex or 55 Hex. 55 Hex is AA Hex shifted by one bit. Bit 0 is then the first bit of the first data byte in the packet. To ensure data integrity, the data stream ends with a checksum byte. Only if the checksum is correct does the receiver accept the data as valid and acknowledge the receipt of the data to the transmitter.

In addition to the above, the data includes a protocol for multiple devices on the same AC power line as shown in FIG. 1. One of the devices, called the master, is typically selected to be the location unit 101. The master tells the other devices when they may talk. The other devices under control of the master would be vending machine units 100A–100C as shown in FIG. 1. When each vending machine unit 100 is enabled by master unit 101, they are enabled to transmit. In this polling scheme, some of the vending machine units 100A–100C do not need to send data when polled.

Each device 100 and the location unit 101 has a device address. A data packet is used which always includes the destination address such that the device just polled does not have to send its data only to the master. Data may be routed to other vending machine units 100A–100C. Also, there is enough time in this protocol between the master polling to allow a receiving device to answer a data transmission. Typical data packets are shown in Table 1.

TABLE 1

Data Packet Format

Master Device Poll of another device:

[AA] [AA] [AA] [Poll Command] [Poll Address] [Checksum]
|________________|
synch bytes Device Data transmission:

[AA] [AA] [AA] [Command] [Dest. Address] [Data . . . ]
|________________|           [Checksum]
synch bytes In time sequence, a Poll, data transmission and answer:
[MASTER Polls Device n] [Device n sends to Device m]
[Device m sends answer to Device n] . . .
[MASTER polls device m]

Figure 7:
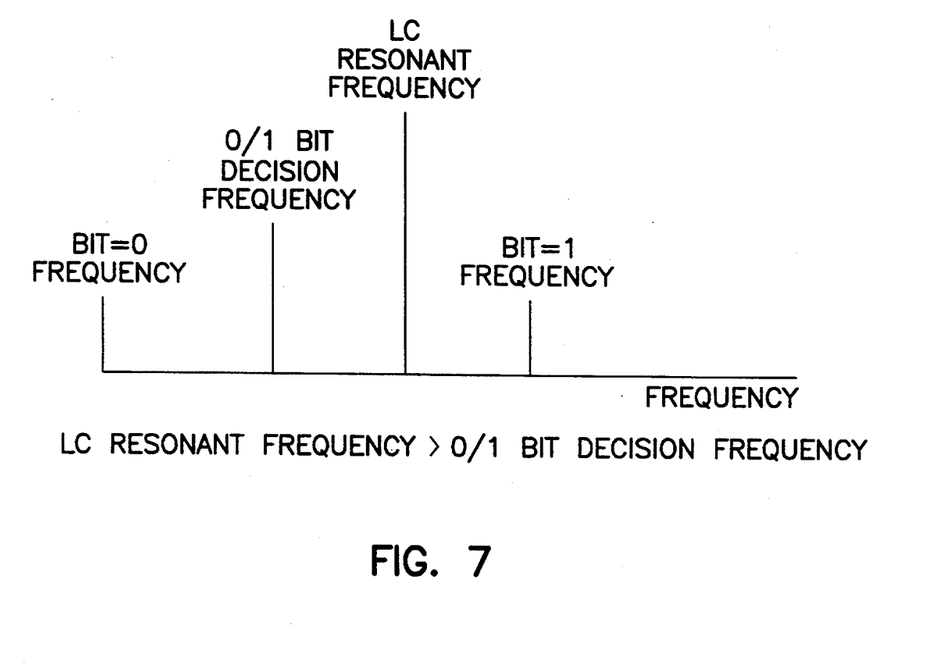
FIG. 7 is a frequency domain plot of the FSK frequencies in relation to the decision frequency and the LC resonant frequency.

Referring once again to FIG. 7, the power line carrier interface operates at a carrier frequency selected to be approximately 125 kilohertz in the preferred embodiment of the present invention. The bit 0 frequency is selected to be 124.3 kilohertz, while the bit 1 frequency is selected to be 125.7 kilohertz. The 0/1 bit decision frequency of FIG. 7 is selected to be 125.4 kilohertz.

Referring once again to FIG. 8, in the preferred embodiment of the present invention, the transmit frequency data rate is approximately 50 baud. The base data period shown in FIG. 8 is 8 milliseconds such that a transmitted 1 takes 3 clock periods and a transmitted 0 takes 2 clock periods. A bit equal to 1 is 16 milliseconds of a high frequency followed by 8 milliseconds of a low frequency. In order to make a decision between the frequencies, a decision time of approximately 12 milliseconds is allowed. A decision frequency guard band or gap of approximately 4 milliseconds is required between bits.

In the data transmitted protocol described more fully below, a data packet is comprised of 12 data bytes including a preamble, a postamble and a checksum. This amounts to 16 total bytes transmitted in approximately 2.5 seconds at 50 baud.

Because of the error immunity of the preferred embodiment of the present invention, retransmission of data packets is rarely required. Test data has shown that 10,000 data packets per day transmitted in a noisy, power line environment near an electrical substation required only five re-tries during an entire test period.

The transmitter carrier at approximately 125 kilohertz actually adds a 25 volt peak-to-peak high frequency signal on top of a 60 cycle power line current. Using this specification, test results have shown that 2,500 foot transmissions are possible in a noisy environment with minimal noise corruption. With a standard power line transformer such as found in commercial environments, this transmission distance is dropped to approximately 500 feet. The degradation from transmitter to receiver is approximately—60 dbm, where the transmit voltage is 25 volts and the received voltage is approximately 5 millivolts.

Vending Machine Applications

The preferred embodiment of the present invention may be used on vending machine and utility meter applications. The data protocols for vending machine applications are shown in Tables 2-7, while the utility meter data protocols are shown in Tables 8-10.

The vending applications always respond to a poll by sending 17 bytes containing 12 data bytes for all machine types. In some cases, not all of the machine data can be sent in one poll or response. The polling command is shown in Table 2.

The data packet format for responding to a poll from a constant price machine is shown in Table 3. Constant price vending machines send all data in one poll or response. The data always consists of 17 bytes containing 12 bytes of data as shown in Table 3.

Table 4 shows the status byte, which is bytes 14 and 15 of Table 3. These status bytes are bit-packed data giving the status of the machine such as low temperature, door open, etc.

Status byte 2 of the vending machine polling response data format is shown in Table 5. Status byte 2 refers to byte 15 of the vending machine polling response format of Table 3.

Variable pricing machines respond to a poll by sending 17 bytes containing 12 bytes of group data as shown in Table 6. Group 0 equals the group containing the money in/out and status bytes 1 and 2. All other groups send 10 product counts with the status byte 1. Status byte 2 is only sent with group 0 since there are no alarms for the motor/switch stuck, therefore, there is no need to constantly see this status byte.

The group N equals greater than 0 for the variable price machines is shown for the vending poll response format of Table 7.

Utility Meter Applications

The polling format for a utility meter application is shown in Table 8. This polling format consists of five bytes, as shown.

The utility meter polling response format is shown in Table 9. The utility meter transponder can be configured as two meters/XP with peak watts or as four meters/XP with only meter 1 having the ability to measure peak watts. Thus, Table 9 shows the configuration of two meters with peak watts, while the configuration of Table 10 shows a polling response for a configuration of four meters with only meter 1 having peak watts.

TABLE 2

Vend Poll Format
The Vend POLL consists of 5 Bytes:

| Byte | Description |
| --- | --- |
| 1-2 | AA Hex Synch Bytes |
| 3 | POLL/Reset Cmd = 00/01 Hex Bits 6-1 are application type bits =0= Vending application, Bit 7 ALWAYS = 0 because of synch byte data. |
| 4 | Machine (XP) #, 01 Hex to 7F Hex CAN NEVER BE > 127, since it is used to denote CONSTANT Price vs. Variable Price |
| 5 | CheckSum = Complement of (XP #+POLL/Reset) |

TABLE 3

Vend POLL Response Format
1. Constant Price Machines
Constant Price Machines send all data in one POLL response. The Data ALWAYS consists of 17 Bytes containing 12 Data Bytes:

| Byte | Description |
| --- | --- |
| 1-2 | AA Hex Synch Bytes |
| 3 | SEND TO Host Addr, 00 to 03 Hex denotes which Host should accept data. Bit 3 = 1st POLL Bit = 1st POLL since vending machine powered-up. Bits 6-4 are UNUSED at this time. Bit 7 ALWAYS = 0 because of synch byte data. |
| 4 | Vending Machine #, 00 to 7F Hex verifies correct machine response |
| 5 | # of CREDITs Count, 00 to FF Hex |
| 6 | # of Vends, Product #1 |
| 7 | # of Vends, Product #2 |
| 8 | # of Vends, Product #3 |
| 9 | # of Vends, Product #4 |
| 10 | # of Vends, Product #5 |
| 11 | # of Vends, Product #6 |
| 12 | # of Vends, Product #7 |
| 13 | # of Vends, Product #8 |
| 14 | Status Byte #1 (See Below) |
| 15 | Status Byte #2 |
| 16 | Product Out Bits 1-8 Bit 7 = Product Out #1, Bit 0 = Out #8 |
| 17 | Checksum = Complement of SUM of Bytes 3-16 |

TABLE 4

Status Byte 1 and 2 ALWAYS have the same meaning, regardless of machine type:
Status Byte 1:

| Bit | Meaning |
| --- | --- |
| 0 | ALWAYS = 0 |
| 1 | Lamp(s) ON = HI (1) |
| 2 | Temperature LOW Limit OK = HI (1) |
| 3 | Temperature HIGH Limit OK = HI (1) |
| 4 | Door OPEN = HI (1) |
| 5 | Bill Validator FULL = HI (1) |
| 6 | Correct Change ON = HI (1) |
| 7 | ALWAYS = 0 |

TABLE 5

VEND POLL RESPONSE FORMAT
1. Constant Price Machines, Cont'd.
Status Byte 2:

| Bit | Meaning |
| --- | --- |
| 0-3 | Machine configuration = 0 = 7 Vend POP Machine = 1 = 8 Vend POP Machine = 2 = 8 Vend OLD Style POP Machine = 3 =70 Vend Snack Machine |

TABLE 5-continued

VEND POLL RESPONSE FORMAT
1. Constant Price Machines, Cont'd.
Status Byte 2:

| Bit | Meaning |
|---|---|
|  | CAN BE UP TO 15 Configurations |
| 4 | Motor STUCK HI (1) |
| 5 | Switch STUCK HI (1) |
| 6 | 1st POLL = HI (1) Reflects 1st POLL Bit in SEND TO Addr |
| 7 | ALWAYS = 0 |

TABLE 6

Vend POLL Response Format
2. Variable Price Machines, Cont'd
a. GROUP 0 Response

| Byte | Description |
|---|---|
| 1-2 | AA Hex Synch Bytes |
| 3 | SEND TO Host Addr, 00 to 03 Hex Denotes Which Host should get data. Bit 3 = lot Poll Bit = 1st POLL since vending machine powered-up. Bits 6-4 are UNUSED at this time. Bit 7 ALWAYS = 0 because of synch byte data. |
| 4 | Vending Machine #, 00 to 7F Hex Verifies correct machine response |
| 5 | GROUP # = 00 Hex |
| 6 | Money IN HI Byte |
| 7 | Money IN LO Byte |
| 8 | Money OUT HI Byte |
| 9 | Money OUT LO Byte |
| 10 | ALWAYS = 00 Hex |
| 11 | ALWAYS = 00 Hex |
| 12 | ALWAYS = 00 Hex |
| 13 | ALWAYS = 00 Hex |
| 14 | ALWAYS = 00 Hex |
| 15 | Status Byte #1 |
| 16 | Status Byte #2 |
| 17 | Checksum = Complement of SUM of Bytes 3-16 |

TABLE 7

Utility POLL Response Format
2. Variable Price Machines, Cont'd.
b. GROUP n > 0 Response

| Byte | Description |
|---|---|
| 1-2 | AA Hex Synch Bytes |
| 3 | SEND TO Host Addr, 00 to 03 Hex Denotes Which Host should get data. Bit 3 = 1st POLL Bit = 1st POLL since vending machine powered-up. Bits 6-4 are UNUSED at this time. Bit 7 ALWAYS = 0 because of synch byte data. |
| 4 | Vending Machine #, 00 to 7F Hex Verifies correct machine response |
| 5 | GROUP # = 01 to 09 Hex |
| 6 | Vend Count, Product (Group-1) *10+1 |
| 7 | Vend Count, Product (Group-1) *10+2 |
| 8 | Vend Count, Product (Group-1) *10+2 |
| 9 | Vend Count, Product (Group-1) *10+4 |
| 10 | Vend Count, Product (Group-1) *10+5 |
| 11 | Vend Count, Product (Group-1) *10+6 |
| 12 | Vend Count, Product (Group-1) *10+7 |
| 13 | Vend Count, Product (Group-1) *10+8 |
| 14 | Vend Count, Product (Group-1) *10+9 |
| 15 | Vend Count, Product (Group-1) *10+10 |
| 16 | Status Byte #1 |
| 17 | Checksum = Complement of SUM of Bytes 3-16 |

TABLE 8

Utility Meter POLL Format
The Utility Meter POLL consists of 5 Bytes:

| Byte | Description |
|---|---|
| 1-2 | AA Hex Synch Bytes |
| 3 | POLL/Reset Cmd = 40/41 Hex Bits 6-1 are application type bits = 40H = Meter application, Bit 7 ALWAYS = 0 because of synch byte data. |
| 4 | Machine (XP) #, 01 Hex to 7F Hex CAN NEVER Be > 127, Since used to Denote CONSTANT Price vs. Variable Price |
| 5 | CheckSum = Complement of (XP #+Reset Bit) NEVER Count 40H application bit. |

TABLE 9

Utility Meter POLL Response Format
1. 4 Meter Response
Response is variable length, depending upon # of Meters enable:

| Byte | Description |
|---|---|
| 1-2 | AA Hex Synch Bytes |
| 3 | SEND TO Host Addr, 00 to 03 Hex Denotes Which Host should accept data. Bits 4 & 6 ARE ALWAYS = 1 (48H) in this application. BIT 7 ALWAYS = 0 because of synch byte data. |
| 4 | Transponder #, 00 to FF Hex Verifies correct machine response |
| 5 | Meters ON Cfg., Bit 0 = Meter 2, Bit 1 = Meter 3, Bit 2 = Meter 4 (1 = ON, 0 = OFF) |
| 6 | # Pulses HI, Meter #1 |
| 7 | # Pulses LO, Meter #1 |
| 8 | Min Time HI, Meter #1 |
| 9 | Min Time LO, Meter #1 |
|  | Following Bytes Up to CheckSum are Optional |
| 1a | # Pulses HI, Meter #2, If ON |
| 1b | # Pulses LO, Meter #2, If ON |
| 1c | # Pulses HI, Meter #3, If ON |
| 1d | # Pulses LO, Meter #3, If ON |
| 1e | # Pulses HI, Meter #4, If ON |
| 1f | # Pulses LO, Meter #4, If ON |
| 1n | Checksum = Complement of SUM of Bytes 3-? NEVER count 48H in Byte 3. |

Meter Response

Response is variable length, depending upon number of meters enabled, as shown in Table 9.

TABLE 10

Utility Meter POLL Response Format

| Byte | Description |
|---|---|
| 1-2 | AA Hex Synch Bytes |
| 3 | SEND TO Host Addr, 00 to 03 Hex Denotes which Host should accept data. Bits 4 & 6 ARE ALWAYS = 1 (48H) in this application. BIT 7 ALWAYS = 0 because of synch byte data. |
| 4 | Transponder #, 00 to FF Hex Verifies correct machine response. |
| 5 | Meters ON Cfg, Bit 0 = Meter 2 (1 = ON, 0 = OFF) |
| 6 | # Pulses HI, Meter #1 |
| 7 | # Pulses LO, Meter #1 |
| 8 | Min Time HI, Meter #1 |
| 9 | Min Time LO, Meter #1 |
|  | Following Bytes Up to CheckSum are Optional |
| 1a | # Pulses HI, Meter #2, If ON |
| 1b | # Pulses LO, Meter #2, If ON |

TABLE 10-continued

Utility Meter POLL Response Format

| Byte | Description |
|---|---|
| 1c | Min Time HI, Meter #2, If ON |
| 1d | Min Time LO, Meter #2, If ON |
| 1n | Checksum = Complement of SUM of Bytes 3–? NEVER count 48H in Byte 3. |

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A power line carder telecommunication apparatus, comprising:
    tuned interface means for connection to a power line for transmission and reception of messages and having a timed resonant frequency;
    tramsmission means connected to the tuned interface means for transmitting a first frequency selected to be below the tuned resonant frequency for a first data clock period to indicate the transmission of a data separator; and
    the transmission means further for transmitting a second frequency selected to be above the tuned resonant frequency having a second data clock period to indicate the transmission of a logical ZERO andh having a third data clock period to indicate the transmission of a logical ONE.

2. A method of communicating information over a power line, comprising the steps of:
    placing a polling message on the power line;
    receiving the polling message from the power line and transmitting the information in response thereto, comprising the substeps of:
    transmitting a first frequency for a first data clock period to indicate the transmission of a data separator;
    transmitting a second frequency for a second data clock period following the first data clock period to indicate the transmission of a logical ONE; and
    transmitting the second frequency for a third data clock period following the first data clock period to indicate the transmission of a logical ONE.

3. A method of encoding data for serial communication of information over a power line, the power line having an alternating current frequency, comprising the steps of:
    assigning a tuned resonant frequency selected to be higher than the alternating current frequency on the power line;
    assigning a data clock period having a duration selected to be in excess of the time period of noise spikes on the power line;
    assigning a first frequency to correspond to a local ZERO which is selected to be lower than the tuned resonant frequency;
    assigning a second frequency to correspond to a logical ONE which is selected to be higher than the tuned resonant frequency;
    assigning a decision frequency to discriminate between a logical ONE and logical ZERO such that a received frequency below the decision frequency is decoded as a logical zero and such that a received frequency above the decision frequency is decoded as a logical ONE, the decision frequency selected to be between the tuned resonant frequency and the first frequency;
    transmitting the first frequency for one data clock period followed by no signal in the next data clock period to indicate the transmission of a logical ZERO; and
    transmitting the second frequency for two data dock periods followed by no signal for the next data dock period to indicate the transmission of the logical ONE.

4. The method according to claim 3 wherein the step of assigning a decision frequency further includes assigning the decision frequency such that noise received on the power line is interpreted as a logical ONE.

* * * * *

UNITED STATES PATENT AND TRADEMARK OFFICE
CERTIFICATE OF CORRECTION

PATENT NO. : 5,452,344

DATED : September 19, 1995

INVENTOR(S) : Rodney L. Larson

It is certified that error appears in the above-identified patent and that said Letters Patent is hereby corrected as shown below:

Column 1, line 7, delete "9" and insert therefor --29--.

Column 6, line 36, after "[Data . . .]" insert --[Checksum]--.

Column 6, line 37, delete "[Checksum]".

Column 9, line 7, after "STUCK" insert --=--.

Column 9, line 8, after "STUCK" insert --=--.

Column 9, line 23, delete "lot" and insert therefor --1st--.

Column 11, line 24, delete "carder" and insert therefor --carrier--.

Column 11, line 28, delete "timed" and insert therefor --tuned--.

Column 11, line 29, delete "tramsmission" and insert therefor --transmission--.

Column 11, line 39, delete "andh" and insert therefor --and--.

Column 12, line 38, delete "dock" and insert therefor --clock--.

Column 12, line 40, delete "dock" and insert therefor --clock--.

Signed and Sealed this

Thirty-first Day of December, 1996

*Attest:*

BRUCE LEHMAN

*Attesting Officer*  *Commissioner of Patents and Trademarks*